Inventor:
GERHARD MAX NEUMANN
By: Cushman, Darby & Cushman
Attorneys

United States Patent Office 3,611,677
Patented Oct. 12, 1971

3,611,677
AUTOMATIC ROLLER BAND AIR FILTER ASSEMBLY
Gerhard Max Neumann, Berlin, Dahlem, Germany, assignor to Delbag-Luftfilter GmbH, Berlin, Germany
Filed Nov. 13, 1968, Ser. No. 775,281
Claims priority, application Germany, Nov. 27, 1967, D 37,034
Int. Cl. B01d 46/18
U.S. Cl. 55—354                5 Claims

ABSTRACT OF THE DISCLOSURE

In automatic roller band filter assemblies for filtering air, the filter band passes from one bobbin in an upper portion of the assembly through an intermediate sealed filter portion to a driven bobbin in a lower portion of the assembly with separate adjustable deflecting units in the upper and lower portions.

---

It is desirable to provide deflecting guide means and support means for the filter band as it passes to and from the intermediate portion of the assembly, which guide means should preferably be adjustable to the thickness of the filter band, and the invention secures this by providing units at the said upper and lower portions of the assembly, comprising a deflecting roller and a retaining bar for a set of support strip members extending along the path of travel of and providing support for, the filter band, the said units preferably being capable of moving in a direction perpendicular to the path of travel of the filter band, to allow for the thickness of the filter band.

In a preferred embodiment of the invention, a similar but fixed pair of units are provided, whereby the filter band is supported on both sides by a set of support strip members.

This invention relates to an automatic roller band filter assembly for filtering air, and particularly relates to such filter assemblies comprising an upper portion having a filter band roll of glass fibre or textile freely rotatably mounted therein, and a lower portion having a driven roller for drawing the filter band off the upper roll across a sealed and filtering intermediate portion of the filter assembly. Prefabricated components comprising the said bottom, centre and upper portions, are usually assembled on site and built into an opening in a wall or into a ventilating duct or trunk.

From time to time a fresh roll of filter band is inserted into the upper portion of the filter assembly, the fully wound roll being removed from the bottom portion. This change-over should be rapidly performed with a minimum waste of time.

In the upper portion of such an assembly the filter band must be drawn off its bobbin and deflected into the appropriate direction for travelling across the intermediate filtering portion. Similarly the band must be deflected from the intermediate portion towards the winding-on bobbin in the lower portion of the filter assembly.

The object of the invention is to provide deflecting means which also serve as guide and support means for the filter band as it travels across the intermediate portion of the filter.

The invention consists of an automatic roller band filter assembly, comprising an upper portion, a lower portion and an intermediate sealed filter portion; a roll of filter band on a bobbin freely rotatably mounted in the said upper portion; a driven bobbin rotatably mounted in the said lower portion and adapted to receive filter band from the said upper portion after passing through the said intermediate sealed filter portion; and means for deflecting and supporting the filter band during its travel to, across and from the said intermediate portion of the assembly, the said means comprising a deflecting unit in the said upper portion and a deflecting unit in the said lower portion, the said deflecting units each comprising a deflecting roller mounted in a mounting plate disposed laterally thereto, and strip support member retaining bars disposed in a direction parallel to the longitudinal axis of the deflecting roller; and a plurality of filter band strip support members extending in the direction of travel of the filter band, each of the said filter band strip support members being secured under tension at its upper and lower end to the said retaining bars in the said upper and lower deflecting units respectively.

The mounting plates of the deflecting rollers are preferably provided with adjusting displacing means whereby the units, i.e. deflecting rollers and supporting strip members, may be moved in a direction perpendicular to the direction of travel of the filter band. This facilitates insertion of the filter band when the filter band rolls are replaced. Such adjusting means may comprise screw means and associated manually-operated handles therefor. Alternatively eccentric throw linkages may be used.

The retaining bars of the deflecting units may be in the form of triangular section longitudinally angled retaining bars provided with apertures for the reception therein of for example the angled or hooked ends of the strip supporting members. At least one of the ends of the said strip support members is provided with tensioning means, e.g. wing nuts screwed thereon, for tensioning the assembled strip support members. This arrangement makes for a simple and easily operated design.

In a preferred embodiment of the invention, a further and fixed retaining bar for a further set of support strip members for supporting the travelling filter band is provided separate from each of the said units, whereby the said further set of support strip members is on the opposite side of the travelling filter band to the first set of support strip members.

The said further and fixed retaining bar may be in the form of a fixed triangular section bar. The cross-section of these bars corresponds in mirror reverse to the triangular sections of the retaining bars contained in the deflecting units and they co-operate with the latter for guiding the filter band and for holding a second set of support strip members.

The described form of construction in conjunction with a simple and efficient design of the deflecting rollers provides a straightforward, easily controllable device for inserting the filter band into the centre part of the roller band air filter.

An embodiment of the invention is hereinafter described and illustrated in the accompanying drawings, of which FIG. 1 is a perspective view of a roller band filter assembly according to the invention, FIG. 2 is an exploded perspective view of the lower portion of the filter assembly;

Figure 1:
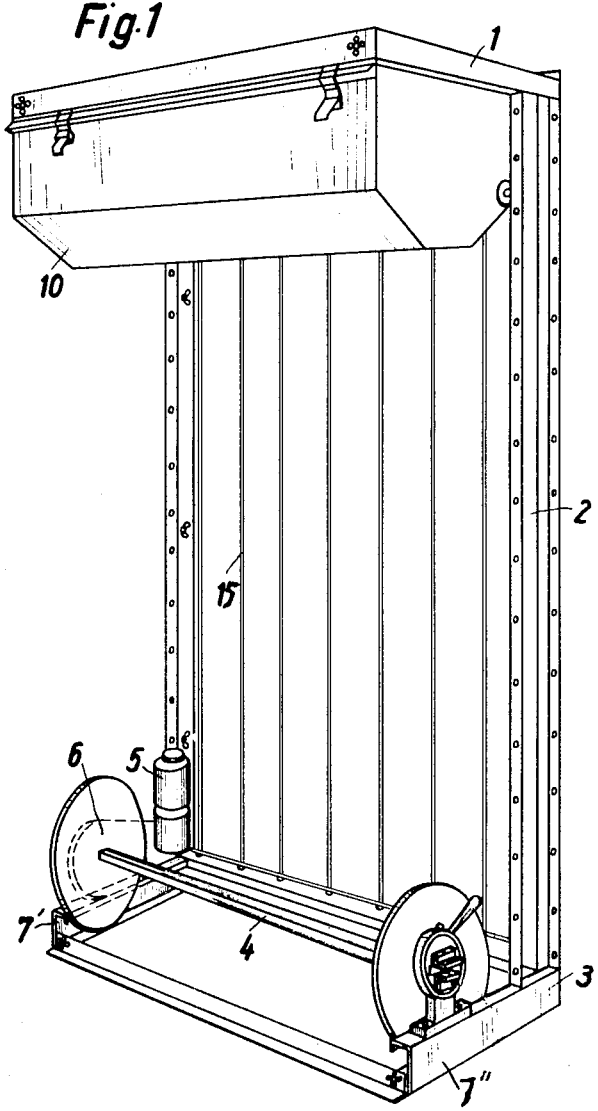

Referring particularly to FIG. 1, the automatic roller band air filter assembly consists of an upper portion 1, an intermediate portion 2 and a bottom portion 3. The upper portion 1 contains a roll of filter band wound on a freely rotatable bobbin (not visible in FIG. 1) mounted thereon. During use the filter band is wound off the said freely rotatable bobbin and is drawn across the filtering portion 2 of the filter and is finally wound up on a driven bobbin 4 in the lower portion 3. In the intermediate portion 2 the dust removed from the dust-laden air is deposited on clean filter cloth pulled off from the upper bobbin, the dirty cloth being wound onto the bottom bobbin 4. After a given period of time the empty upper bobbin is replaced by a full bobbin, and the bobbin 4 at the bottom carrying the dirty cloth is removed.

For directly driving the bobbin 4, a motor 5 associated with a reduction gear 6, is provided.

Figure 2:
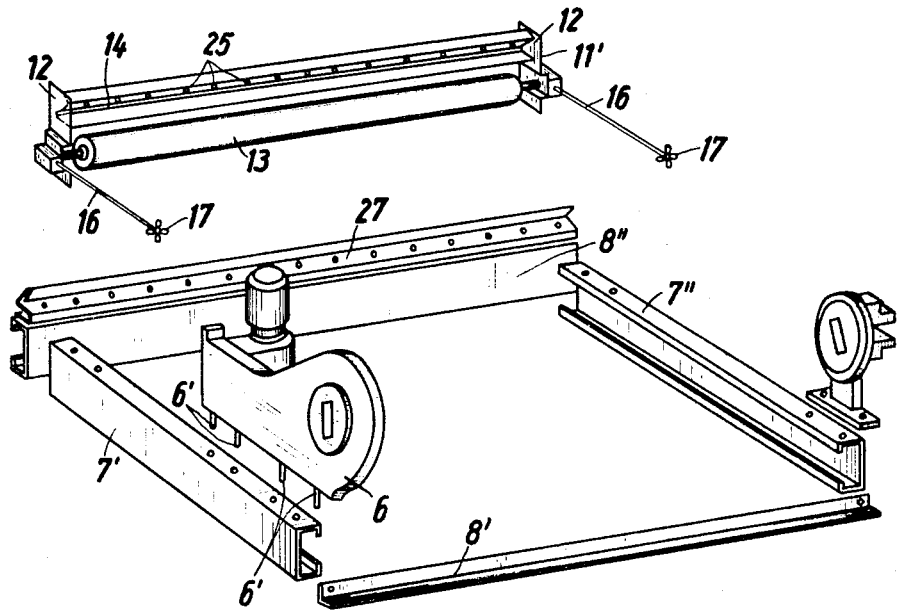
Figure 3:
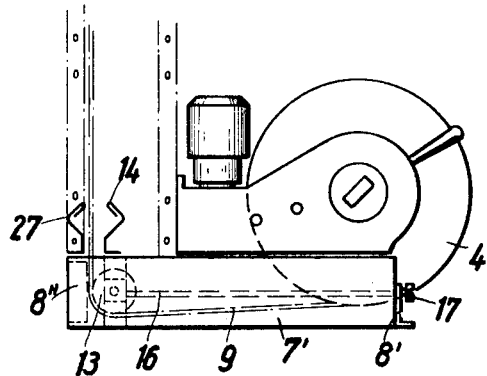
FIG. 3 is a side view of the lower portion of the filter assembly.

As shown in FIG. 2 the base frame of the lower portion of the assembly consists of individual members 7' and 7" and 8' and 8". Gearing 6 is mounted on the frame member 7' by means of pins 6' or the like, the width of the gearing 6 not significantly exceeding the width of the frame member 7'. In order to convey the filter band 9 from the intermediate portion 2 to the lower bobbin 4, a deflecting unit 11' (FIG. 2) is provided in the lower portion 3 of the filter assembly, the said deflecting unit comprising lateral mounting plates 12, a deflecting roller 13 and a retaining bar 14 for retaining band strip support members 15. The lateral mounting plates 12 of the unit are slidably mounted in the members 7' and 7" of the base frame, and can be shifted, perpendicularly to the direction of travel of the band, across the intermediate portion of the filter assembly by means of adjusting screws 16 having manually-operable handles 17 for the purpose of adjusting the deflecting unit to the thickness of the cloth constituting the band 9 and also for facilitating the insertion of the end of the said band. At the same time the band strip support members 15 and their retaining bar 14 are moved in the same direction. As an alternative to the use of adjusting screws, adjustment could be provided by the action of eccentric throw linkages.

Figure 4:
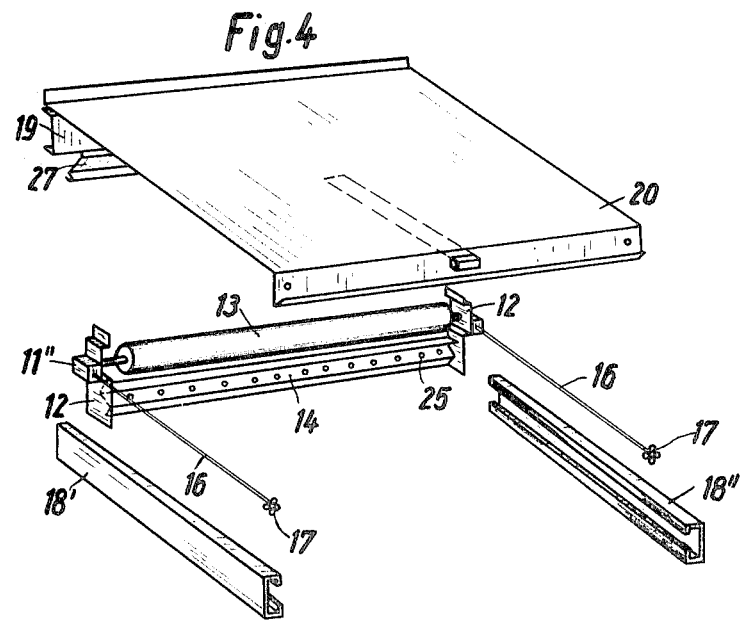
FIG. 4 is an exploded perspective view of the upper portion of the filter assembly.
Figure 5:
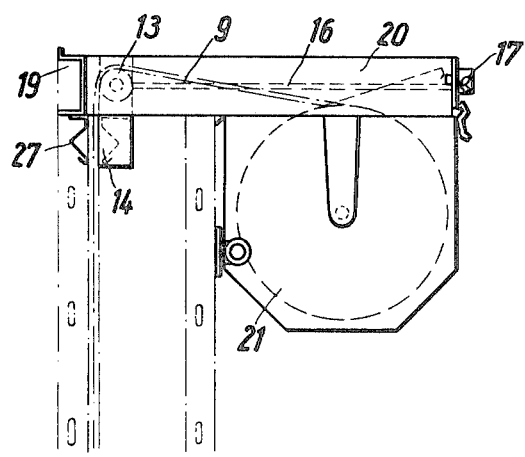
FIG. 5 is a side view of the upper portion of the filter assembly.

Referring to FIG. 4, the upper portion 3 consists of frame members 18, 18" and 19 and a canopy 20. A deflecting unit 11" is slidably mounted between the frame members 18' and 18". The construction of this deflecting unit is substantially the same as that of the deflecting unit 11' in the bottom part of the filter, except that the roller 13 in the upper part is disposed above the retaining bar 14 instead of below. The manner in which the unit functions is likewise the same as shown in FIG. 5, the band 9 is withdrawn from the upper bobbin 21 and then taken over the roller 13 to descend across the intermediate portion 2.

Figure 7:
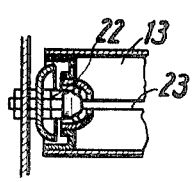
FIG. 7 is a section of the end of a roller and its bearings in the filter assembly.
Figure 8:
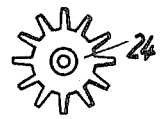
FIG. 8 is an end view of another embodiment of a roller in the filter assembly.

As shown in FIG. 7 the deflecting rollers 13 may be sheet metal tubes provided with sheet metal cone bearings 22, running on fixed round section axles 23. Alternatively, the deflecting roller 24 may have a star-shaped cross-section as shown in FIG. 8, which may be mounted on axle pins.

Figure 6B:
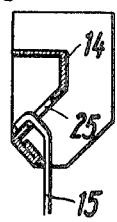
FIG. 6b is a section of the upper retaining bar in the filter assembly.
Figure 6A:
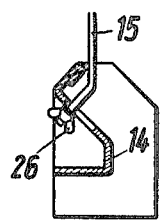
FIG. 6a is a section of the bottom retaining bar in the filter assembly.

The triangular-section bars 14 are provided with holes 25 and the ends of the strip support members 15 are angled as shown in FIGS. 6a and 6b to be hooked into the upper bar 14 (FIG. 6b) and secured to the bottom bar with a wing nut 26. Other tensioning devices may be used if desired. The fixed retaining bars 27 in the upper and lower portions of the filter assembly are of similar configuration. The filter band 9 travels across the intermediate portion 2 between the strip support members 15 and the second set of band strip support members (not shown), associated with the retaining bars 27, the band strip support members supporting the filter cloth against the pressure of the air that is to be filtered. By shifting the deflecting units 11' and 1" the entry cross-section between the band strip support members 14 and 27 can be widened or reduced to adjust the same to the thickness of the filter cloth constituting the band 9, and to facilitate insertion of the said band when the band rolls are replaced.

What is claimed is:

1. An automatic roller band filter assembly, comprising an upper portion, a lower portion and an intermediate portion; a roll of filter band on a bobbin freely rotatably mounted in the said upper portion; a driven bobbin rotatably mounted in the said lower portion and adapted to receive filter band from said upper portion after passage through the said intermediate portion; an upper deflecting roller in said upper portion and a lower deflecting roller in said lower portion for deflecting the filter band to travel across said intermediate portion, said intermediate portion comprising a set of tensionable members for supporting the band; the improvement which consists in (a) a first unit comprising said upper roller, a bar to which the said tensionable members at their upper ends are secured and end plates between which said upper roller and said bar are mounted;

(b) a second separate unit comprising said lower roller, a bar to which the said tensionable members at their lower ends are secured and end plates between which said lower roller and said last mentioned bar are mounted;

(c) means for adjustably mounting each of said units for movement substantially at right anges to said intermediate portion independently of the other.

2. An assembly according to claim 1 comprising screw means whereby the said units may be moved in a direction perpendicular to the direction of travel of the filter band across the intermediate portion.

3. An assembly according to claim 1 in which the said bars are each in the form of a triangular section longitudinally angled bar and provided with apertures for the reception therein of the ends of said tensionable members, at least one of the ends of which is provided with tensioning means carried by a said unit for applying tension to the assembled tensionable members.

4. An assembly according to claim 1 in which further and fixed retaining bars mounting a further set of tensionable members are provided separate from each of the said units, whereby the travelling filter band is supported on both sides thereof by the said sets of tensionable members at the said intermediate portion.

5. An assembly according to claim 1, in which the said deflecting rollers are in the form of hollow tubes made from sheet metal, provided with conical bearing surfaces made from sheet metal.

References Cited

UNITED STATES PATENTS

| | | | |
|---|---|---|---|
| 2,557,185 | 6/1951 | Gibbs | 242—75.43 |
| 2,881,859 | 4/1959 | Nutting | 55—352 |
| 3,013,630 | 12/1961 | Palmore | 55—354 |
| 3,348,366 | 10/1967 | Bennett | 55—354 |
| 3,406,438 | 10/1968 | Reilly | 29—116 |

FOREIGN PATENTS

| | | | |
|---|---|---|---|
| 824,430 | 12/1959 | Great Britain | 55—354 |

FRANK W. LUTTER, Primary Examiner

B. NOZICK, Assistant Examiner

U.S. Cl. X.R.

242—55.1, 75.3, 154